United States Patent [19]

Heller et al.

[11] Patent Number: 5,071,337

[45] Date of Patent: Dec. 10, 1991

[54] APPARATUS FOR FORMING A SOLID THREE-DIMENSIONAL ARTICLE FROM A LIQUID MEDIUM

[75] Inventors: Timmy B. Heller, Attleboro, Mass.; Ray M. Hill, Smithfield; Abdalla F. Saggal, Pawtucket, both of R.I.

[73] Assignee: Quadrax Corporation, Portsmouth, R.I.

[21] Appl. No.: 479,702

[22] Filed: Feb. 15, 1990

[51] Int. Cl.$^5$ .................... B29C 35/08; B29C 67/00; G03C 9/08

[52] U.S. Cl. .................... 425/174.4; 118/603; 118/620; 118/693; 156/272.8; 264/22; 425/217

[58] Field of Search .................... 425/174, 174.4, 217; 264/22, 308; 156/58, 272.8, 275.5; 118/693, 694, 620, 603, 323

[56] References Cited

U.S. PATENT DOCUMENTS

| | | | |
|---|---|---|---|
| 2,381,234 | 8/1945 | Symmes | 430/294 |
| 2,525,532 | 10/1950 | Dreywood | 430/419 |
| 2,775,758 | 12/1956 | Munz | 342/179 |
| 3,609,707 | 9/1971 | Lewis et al. | 365/119 |
| 3,723,120 | 3/1973 | Hummel | 430/327 |
| 4,041,476 | 8/1977 | Swainson | 365/119 |
| 4,081,276 | 3/1978 | Crivello | 430/269 |
| 4,252,514 | 2/1981 | Gates | 425/162 |
| 4,410,562 | 10/1983 | Nemoto et la. | 427/54.1 |
| 4,471,470 | 9/1984 | Swainson et al. | 365/127 |
| 4,575,330 | 3/1986 | Hull | 425/174.4 |
| 4,575,330 | 12/1989 | Hull | 425/174.4 |
| 4,929,402 | 5/1990 | Hull | 264/22 |
| 4,961,154 | 10/1990 | Pomerantz et al. | 364/522 |

FOREIGN PATENT DOCUMENTS

| | | | |
|---|---|---|---|
| 144478 | 11/1981 | Japan . | |
| 61-154815 | 7/1986 | Japan | 264/22 |
| 61-217219 | 9/1986 | Japan | 264/22 |
| 62-101408 | 5/1987 | Japan | 264/22 |
| 62-275734 | 11/1987 | Japan | 264/298 |
| 64-31625 | 2/1989 | Japan | 425/135 |
| WO89/09687 | 10/1989 | PCT Int'l Appl. | 425/135 |
| 566795 | 1/1945 | United Kingdom . | |

OTHER PUBLICATIONS

Hideo Kodama, "A Scheme for Three-Dimensional Display by Automatic Fabrication of Three-Dimensional Model", IECE, vol. J64-C, No. 4, Apr. 1981, pp. 237–241.

Hideo Kodama, "Automatic Method for Fabricating a Three-Dimensional Plsastic Model with Photo-Hardening Polymer", Review of Scientific Instruments, vol. 52, No. 11, Nov. 1981, pp. 1770–1773.

Alan J. Herbert, "Solid Object Generation", Journal of Applied Photographic Engineering, 8(4), Aug. 1982, pp. 185–188, May 18, 1982.

Efrem V. Fudim, "Sculpting Part with Light" Machine Design, Mar., 1986, pp. 102–106.

*Primary Examiner*—James C. Housel
*Attorney, Agent, or Firm*—Fleit, Jacobson, Cohn, Price, Holman & Stern

[57] ABSTRACT

A solid three-dimensional article is formed from a liquid medium by initially coating a layer of the liquid medium on an apertured support plate. An initial cross-section or profile of the article then is formed by solidifying the liquid medium, or at least a portion thereof, on the support plate. An expandable member at a bottom of a container for holding a supply of the liquid medium, then is expanded an incremental amount to raise the level of the liquid medium in the container upward through the apertured support plate to a level above the support plate so as to form a meniscus around the solidified cross-section or profile of the article. The solidified cross-section or profile of the article then is coated with an additional layer of the liquid medium, causing the meniscus to break and the just-added liquid medium layer and the previous liquid medium to merge, whereupon the additional layer is essentially immediately solidified to form another cross-section or profile of the article. The expandable member then is again expanded an incremental amount to again raise the level of the liquid medium in the container upward to define a meniscus around the second solidified cross-section or profile of the article. The foregoing sequence of operation then is repeated until the article has been completely formed.

69 Claims, 19 Drawing Sheets

STEP 1

COAT FIRST LIQUID MEDIUM LAYER ON SUPPORT.

STEPS 2 & 3

SOLIDIFY FIRST ARTICLE CROSS-SECTION AND RAISE SCANNER HEAD (AND COATING MECHANISM) TO THE NEXT FOCUS LEVEL.

STEP 4

RAISE LIQUID MEDIUM LEVEL ONE LAYER TO FORM MENISCUS AROUND SOLIDIFIED FIRST ARTICLE CROSS-SECTION.

STEP 5

COAT NEXT LIQUID MEDIUM LAYER ON SOLIDIFIED FIRST ARTICLE CROSS-SECTION.

STEP 6

MENISCUS BREAKS AND LIQUID MEDIUM LAYERS MERGE.

STEPS 7 & 8

SOLIDIFY NEXT ARTICLE CROSS-SECTION AND RAISE SCANNER HEAD (AND COATING MECHANISM) TO THE NEXT FOCUS LEVEL.

REPEAT LIQUID MEDIUM LEVEL RAISING, COATING, SOLIDIFYING AND SCANNER HEAD (AND COATING MECHANISM) RAISING STEPS TO COMPLETE ARTICLE.

APPARATUS FOR FORMING A SOLID THREE-DIMENSIONAL ARTICLE FROM A LIQUID MEDIUM

BACKGROUND OF THE INVENTION

1. Field of the Invention

This invention relates to a method of and apparatus for forming a solid three-dimensional article from a liquid medium, and more particularly to a method of and apparatus for forming a solid three-dimensional article from a liquid medium capable of solidification when subjected to prescribed energy, wherein the article can be formed in a rapid and expeditious manner as compared to prior known systems.

2. Description of the Prior Art

In general, apparatus for forming a solid three-dimensional article from a liquid medium capable of solidification when subjected to prescribed energy, are known in the prior art. For example, O. J. Munz U.S. Pat. No. 2,775,578 discloses a system for generating three-dimensional objects from a liquid medium by irradiating liquid layers with the aid of a computer program irradiation source and a translational mechanism. A similar arrangement is disclosed in the C. W. Hull U.S. Pat. No. 4,575,330. Other arrangements of this general type are disclosed in an article by H. Kodama, entitled "Automatic Method for Fabricating a Three-Dimensional Plastic Model with Photo-Hardening Polymer", Review Scientific Instruments, Vol. 52, No. 11, November, 1981, pages 1770–1773, and an article by A. J. Herbert, entitled "Solid Object Generation", Journal of Applied Photographic Engineering 8 (4) August, 1982, pages 185–188. Other prior art of interest includes the Derywood U.S. Pat. No. 2,525,532, Symmes U.S. Pat. No. 2,381,234, Hummel U.S. Pat. No. 3,723,120, Lewis et al U.S. Pat. No. 3,609,707, Crivello U.S. Pat. No. 4,081,276 and Gates U.S. Pat. No. 4,252,514, and the British Patent No. 566,795 to Gates.

However, a need still exists for a method of and apparatus for forming a solid three-dimensional article from a liquid medium in a rapid and expeditious manner, with a minimum waste in time and material, and a primary purpose of this invention is to provide such a method and apparatus.

SUMMARY OF THE INVENTION

In general, the subject invention relates to a method of and apparatus for forming a solid three-dimensional article from a liquid medium capable of solidification when subjected to prescribed energy, wherein a first incremental layer of the liquid medium is initially coated on a support. A preselected cross-section of the first incremental layer of the liquid medium then is solidified by exposing at least a portion of the layer to prescribed energy, to form a first cross-section of the solid three-dimensional article. The level of the liquid medium surrounding the solidified first cross-section then is raised so as to form a meniscus around the periphery of the first cross-section. Next, the solidified first cross-section is coated with a second incremental layer of the liquid medium, so that the meniscus surrounding the solidified cross-section is broken and the second incremental layer of the liquid medium and the liquid medium surrounding the second cross-section flow together. This is followed by solidifying a second preselected cross-section of the liquid medium by exposing the liquid medium to prescribed energy, to form a second cross-section of the solid three-dimensional article. Thereafter, the liquid medium level raising, liquid medium coating and liquid medium solidifying operations, are repeated, as necessary, to complete the three-dimensional article.

More specifically, the coating of the first incremental layer on the support, and the liquid medium coating steps, are performed by spraying from above, while the solidifying steps are performed by lasering. The liquid medium is held in a container, and a support for the solid three-dimensional article as it is formed, is of apertured construction and removably mounted in a fixed position in the container. A coating mechanism may be an elongated apertured tube. In the alternative, the coating mechanism may be an outer elongated cylinder and an inner elongated cylinder mounted in relatively rotatable coaxial relationship, with each cylinder including an elongated slot, and with a mechanism for causing relative rotation between the cylinders to cause relative movement of the elongated slots between a non-aligned closed relationship and an aligned coating relationship. The liquid medium may be fed to the coating mechanism by a mechanism for withdrawing liquid medium from a lower portion of the container and feeding the liquid medium to the coating mechanism. The withdrawing-and-feeding mechanism may include a double acting piston in a cylinder and include valves for controlling flow of the liquid medium to and from the piston and cylinder. The coating mechanism may be mounted for horizontal reciprocating movement above the support by a gear rack mechanism and associated drive, or may be mounted for oscillating swinging movement above the support. Raising of the liquid level in the container may be accomplished by an expandable member, such as a bellows in the bottom portion of the container and operable in response to fluid pressure, and the solidifying mechanism and the coating mechanism may be mounted for vertical movement relative to the support in the container.

DETAILED DESCRIPTION

Figure 1:
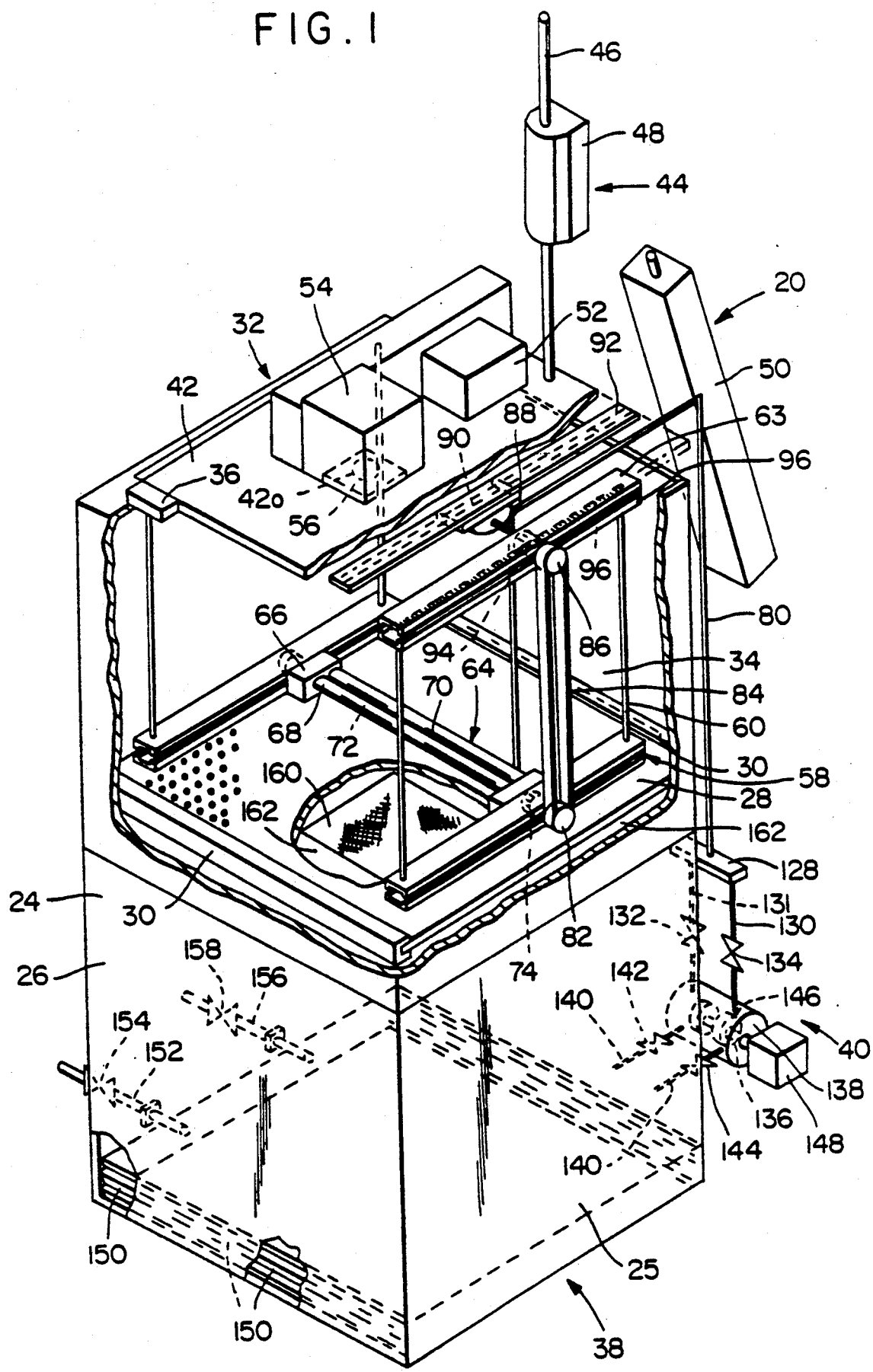
FIG. 1 is an isometric, schematic view of an apparatus for forming a solid three-dimensional article from a liquid medium in accordance with the invention.
Figure 2:
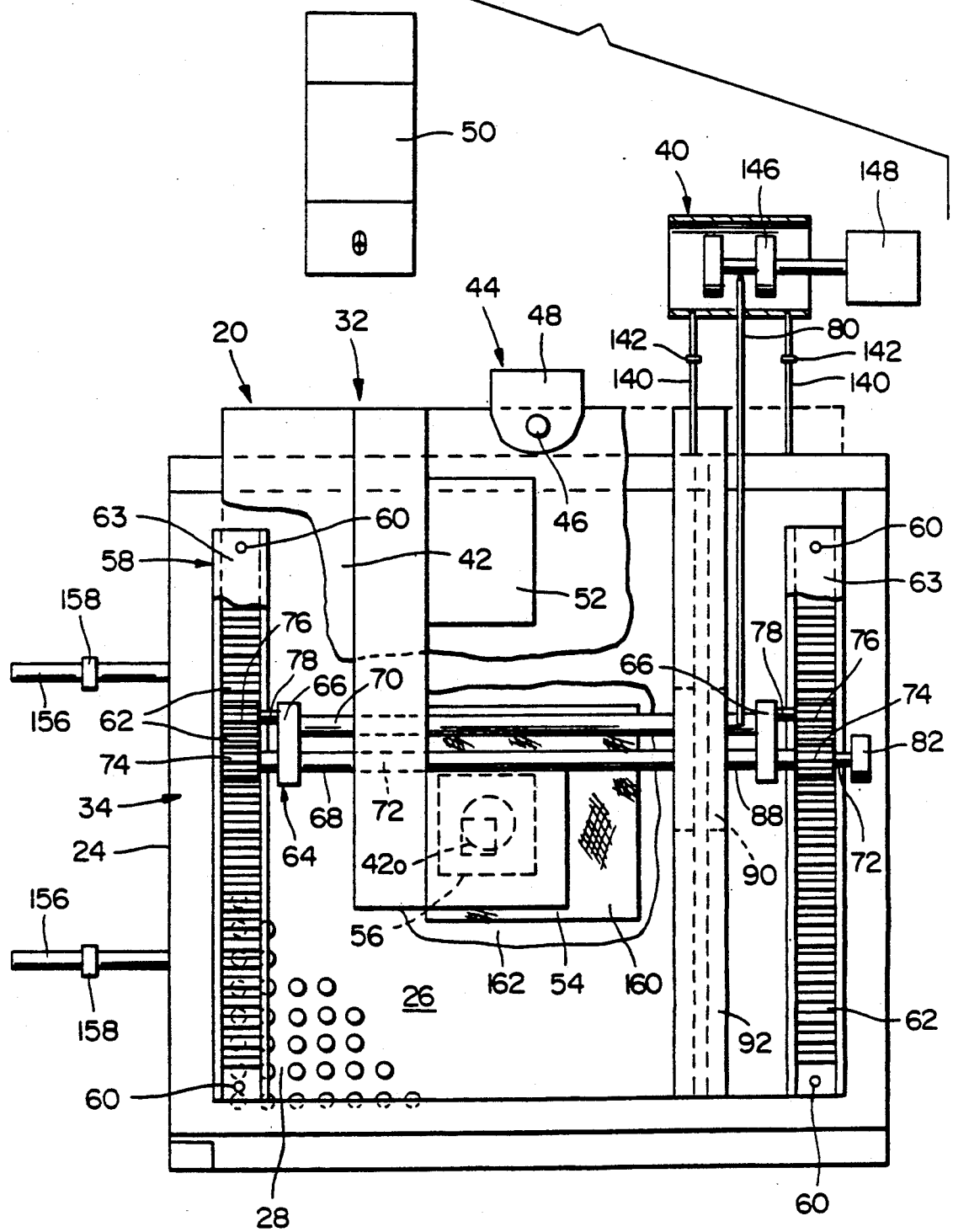
FIG. 2 is plan view of the apparatus shown in FIG. 1.
Figure 18A:
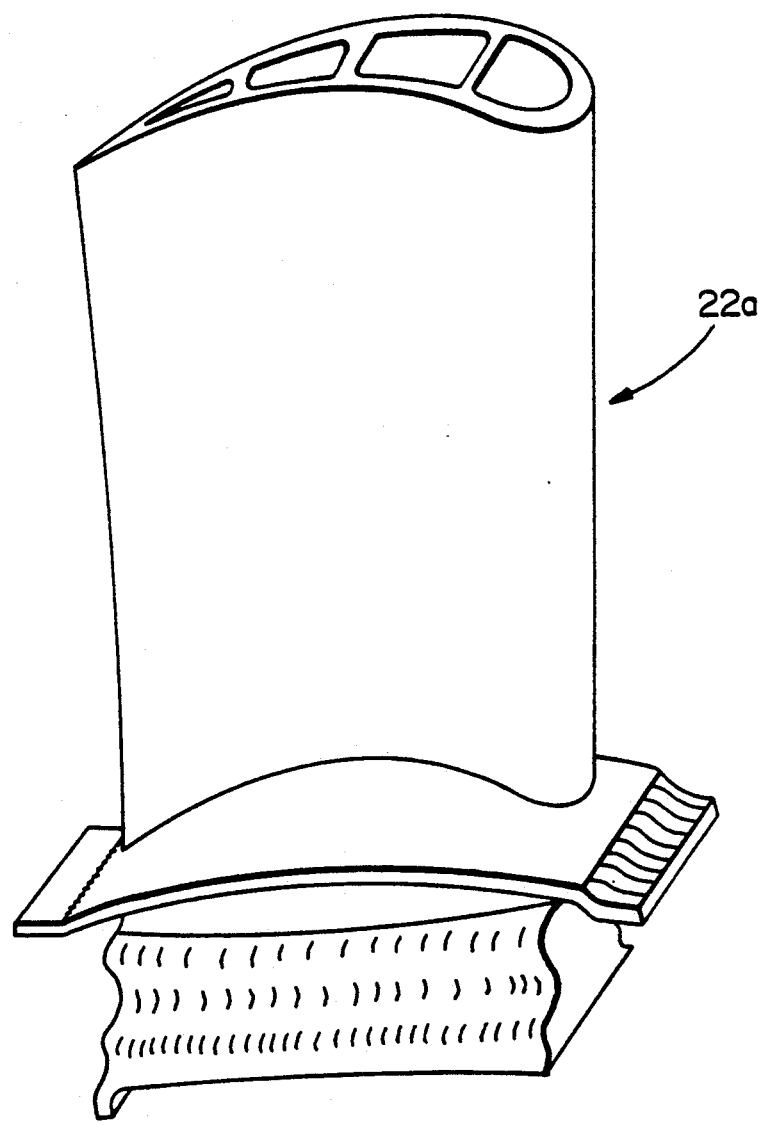
FIGS. 18A and 18B are isometric views of solid three-dimensional articles illustrating various types of shapes which may be formed utilizing the subject invention.
Figure 18B:
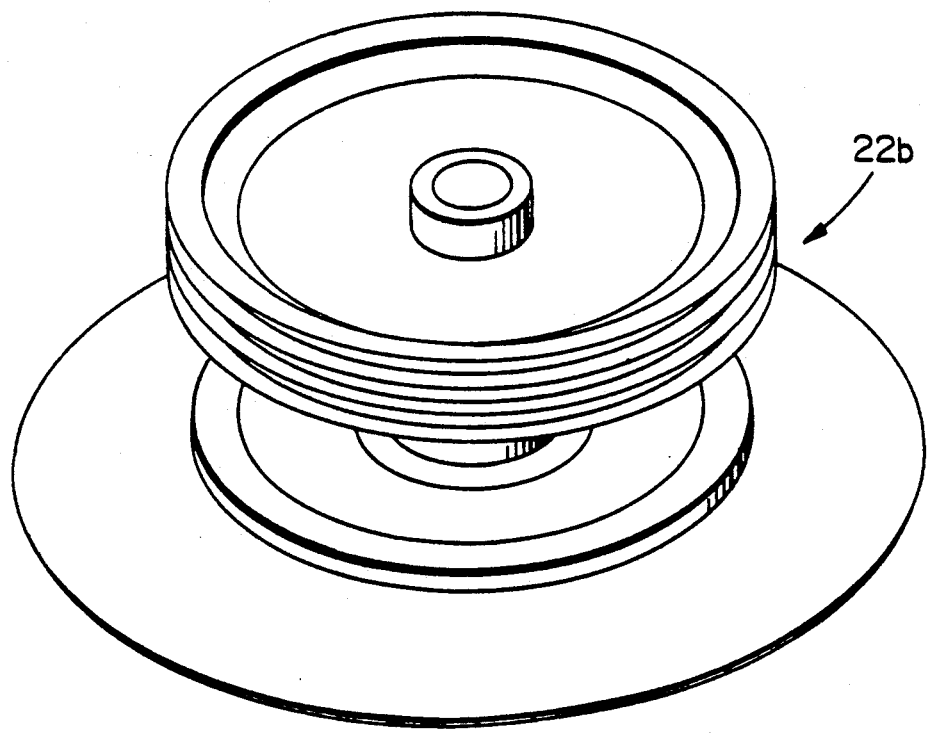

Referring to FIGS. 1 and 2, an apparatus 20 in accordance with the invention, for forming solid three-dimensional articles or parts, such as a turbine blade 22a, as illustrated in FIG. 18A, or a jet fuel swirler 22b, as illustrated in FIG. 18B, is disclosed. The apparatus 20 includes a container 24, having a lower reservoir or sump portion 25 for holding liquid medium 26. An upper tank portion 24T of the container 24 includes a horizontally disposed apertured support plate member 28, for supporting the article 22 being formed during a forming operation. The support plate member 28 is removably mounted (through a door, not shown) in the container 24 in a fixed position against vertical movement, at an intermediate level, such as by having peripheral edge portions received in slotted guide members 30 (FIG. 1) fixed to the container interior walls. The apparatus 20 further includes a vertically movable energy scanning mechanism 32 for solidifying successive preselected cross-sections of the liquid medium 26, to form one of the articles 22. A liquid medium coating mechanism 34 and a liquid medium level sensor 36 (FIG. 1) of a laser beam-emitting type, which is responsive to reflected laser light from the surface of the liquid medium 26, are mounted on the vertically movable scanning mechanism 32 above the fixed support plate member 28. As is shown in FIG. 1, a liquid medium level raising mechanism 38 is provided in the bottom of the container 24, and a liquid medium withdrawal-and-feeding mechanism 40 also is provided adjacent the lower end of the container exteriorly thereof.

The vertically movable scanning mechanism 32 comprises a horizontal support plate 42 which is connected to a vertical traversing mechanism 44, such as a screw-threaded member 46 driven vertically by a reversible motor 48, for raising and lowering the scanning mechanism. A source of prescribed energy, such as a laser 50 capable of operating in an ultraviolet and/or visible light frequency range, as is well known in the art, a laser beam focusing optics system 52 and a scanner head 54, for directing the laser beam energy to solidify successive layers of the liquid medium 26, are all also mounted on the support plate 42 in a suitable manner. The horizontally disposed support plate 42 has an opening 42o formed therein beneath the scanner head 54, and is provided on its underside with a shutter 56 which is movable to an open position for a scanning operation, and movable to a closed position during the liquid medium coating operation, to prevent extraneous liquid medium from contaminating the optics system 52. For example, the shutter 56 may be secured to one end of a pivoted lever (not shown) pivotably connected at its opposite end to a solenoid (not shown) mounted beneath the support plate 42.

Referring to FIGS. 1 and 2, the liquid medium coating mechanism 34 may comprise a sub-frame 58 suspended beneath the horizontal plate 42. The sub-frame 58 includes a plurality of depending vertical legs 60 at each corner of the support plate 42, and horizontally disposed gear racks 62 and respective opposed guide members 63 connected between lower ends of respective ones of the vertical legs. The coating mechanism 34 further includes a coating carriage 64 of rectangular rigid construction, comprising opposite end plates 66 (FIG. 1), a drive shaft-enclosing tube 68 defining one longitudinal side of the carriage, and a liquid medium dispensing mechanism in the form of a spray tube 70 defining the opposite longitudinal side. The carriage 64 extends between the gear racks 62 and guide member 63 and further includes a drive shaft 72 journaled in the end plates 66 and having drive pinion gears 74 fixed thereto adjacent its opposite ends. The pinion gears 74 are disposed between respective ones of the opposed gear racks 62 and guide members 63, which thus guide the coating carriage 64 for horizontal movement therebetween. An idler pinion gear 76 (best shown in FIGS. 2 and 3) is rotatably mounted on a stub shaft 78 projecting from each end plate 66 and also is disposed between the adjacent gear racks 62 and guide members 63, to maintain the coating carriage 64 against rotation about the drive shaft 72, during the horizontal movement of the spray tube 70. The liquid medium 26 is fed into the spray tube 70 via a flexible line 80.

Figure 3:
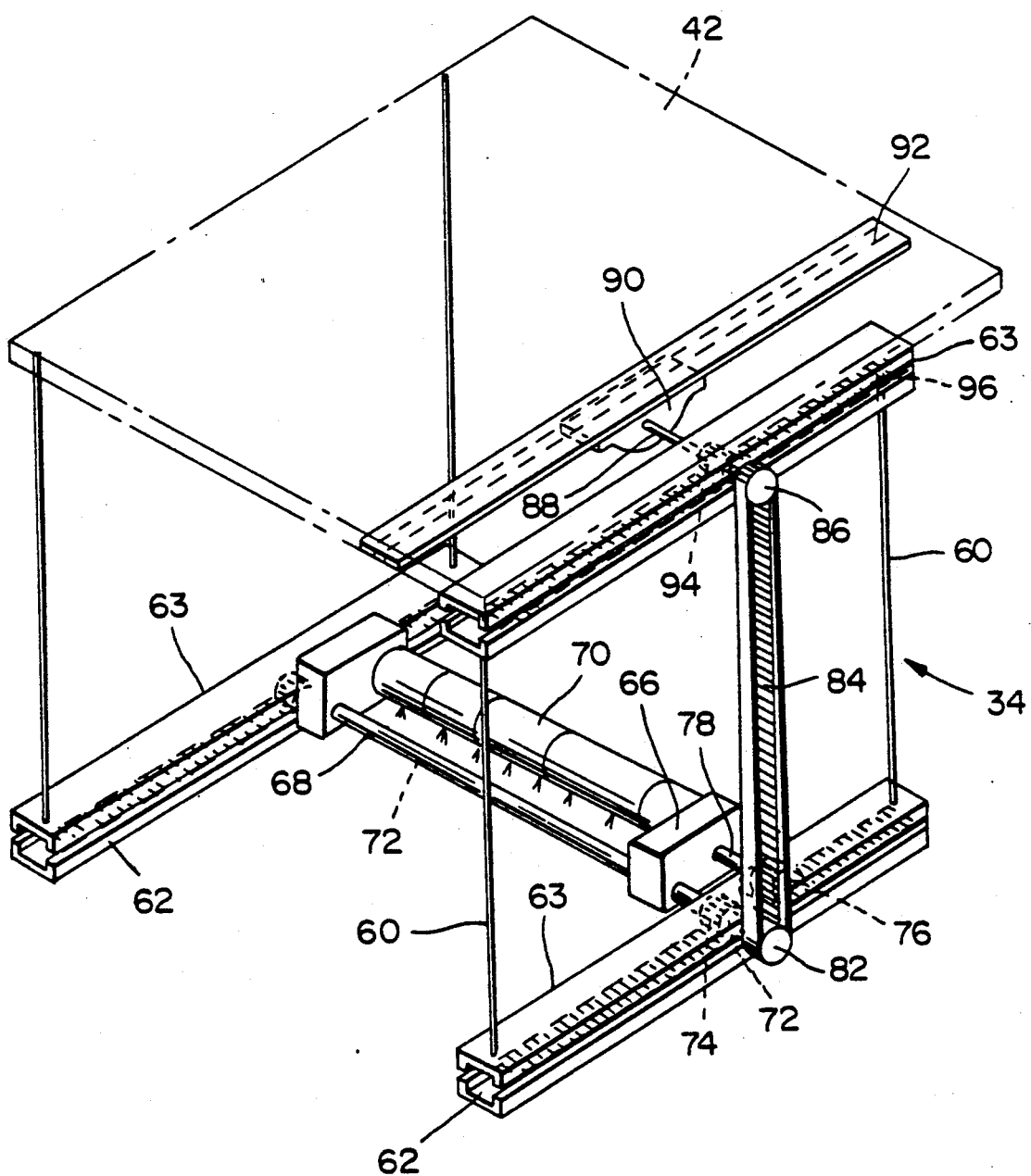
FIG. 3 is an enlarged isometric view of a coating mechanism of the apparatus shown in FIG. 1, for applying successive coatings of the liquid medium in the forming of the solid three-dimensional article.

As is best shown in FIG. 3, extended portion of the drive shaft 72 has a drive pulley 82 fixed thereto and connected by a timing belt 84 to a pulley 86 secured to a drive shaft 88 of a small reversible motor 90 mounted for sliding movement on a dove-tail guide 92 secured to the underside of the horizontally disposed support plate 42. The drive shaft 88 of the motor 90 also has a pinion gear 94 secured thereon and engageable with a horizontally disposed gear rack 96 extending between and fixedly connected to adjacent ones of the vertical legs 60 below the horizontal plate member 42. Accordingly, during a liquid medium coating operation, rotation of the motor 90 causes it to drive itself along its guide 92 by engagement of its drive pinion gear 94 with the gear rack 96, while at the same time, causing the coating carriage 64 to be driven along the lower gear racks 62 by means of the timing belt 84, and the pulley 82 and pinion gears 74 on the coating carriage 64.

Figure 4:
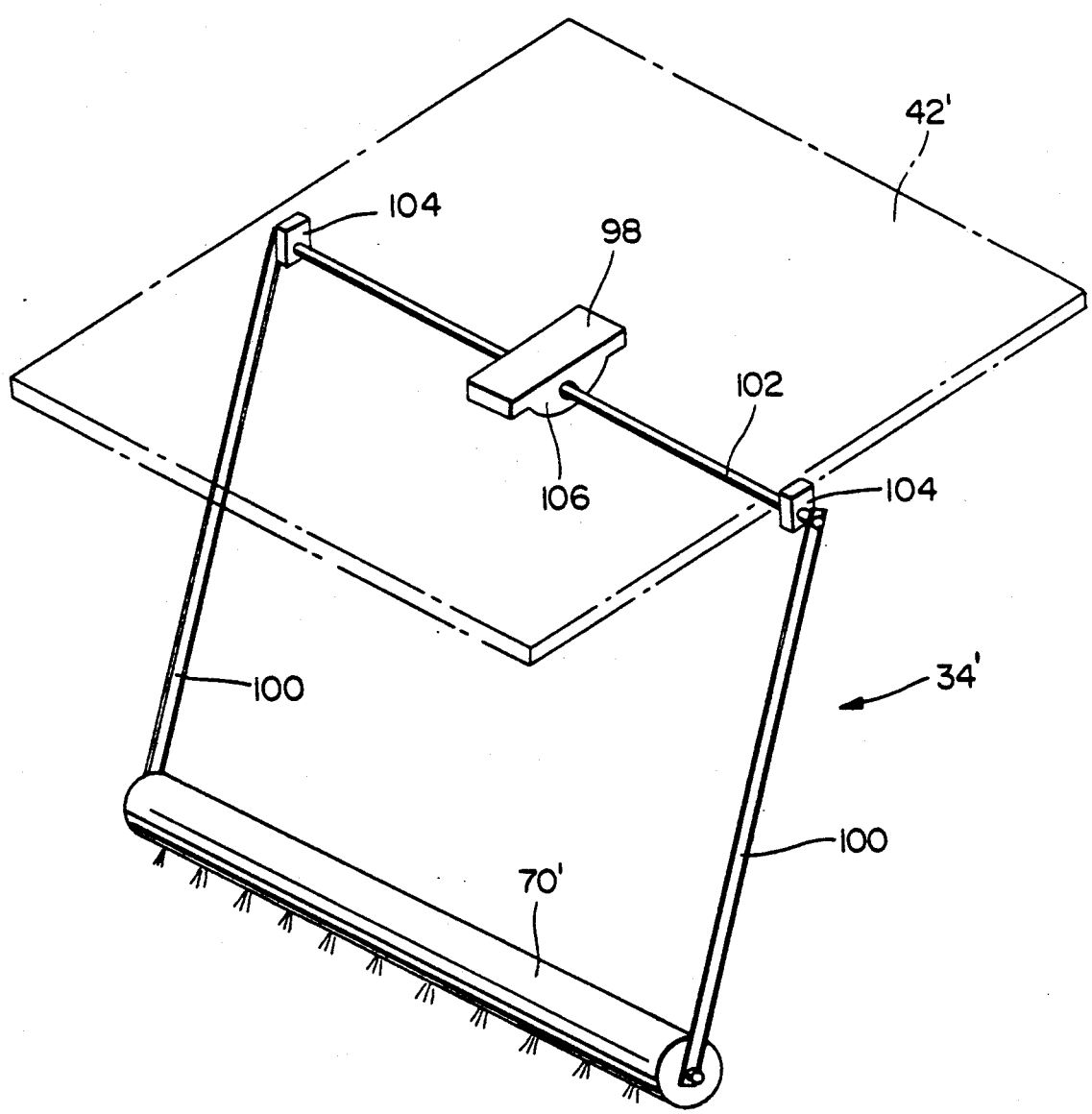
FIG. 4 is an isometric view, similar to FIG. 1, showing an alternate form of coating mechanism to that shown in FIGS. 1-3.

FIG. 4 discloses an alternative embodiment of the invention in which a cylindrical spray tube 70' of a coating mechanism 34' is mounted beneath a horizontal support plate 42' by a pendulum-type oscillating mounting 98. In this embodiment, opposite ends of the spray tube 70' are secured to a pair of horizontally spaced vertically depending legs 100 secured at their upper ends to a horizontal rotatable shaft 102 mounted in suitable bearings 104 secured to the underside of the horizontal support plate 42'. The rotatable shaft 102 forms a drive shaft of a small reversible motor 106 fixedly mounted on the underside of the horizontal support plate 42'. Thus, by operating the motor 106 through a preselected angle, such as 40°, the spray tube 70' can be moved along an arc for spraying liquid medium 26 toward an apertured article support plate (not shown in FIG. 4) in a liquid medium-coating operation.

Figure 5A:
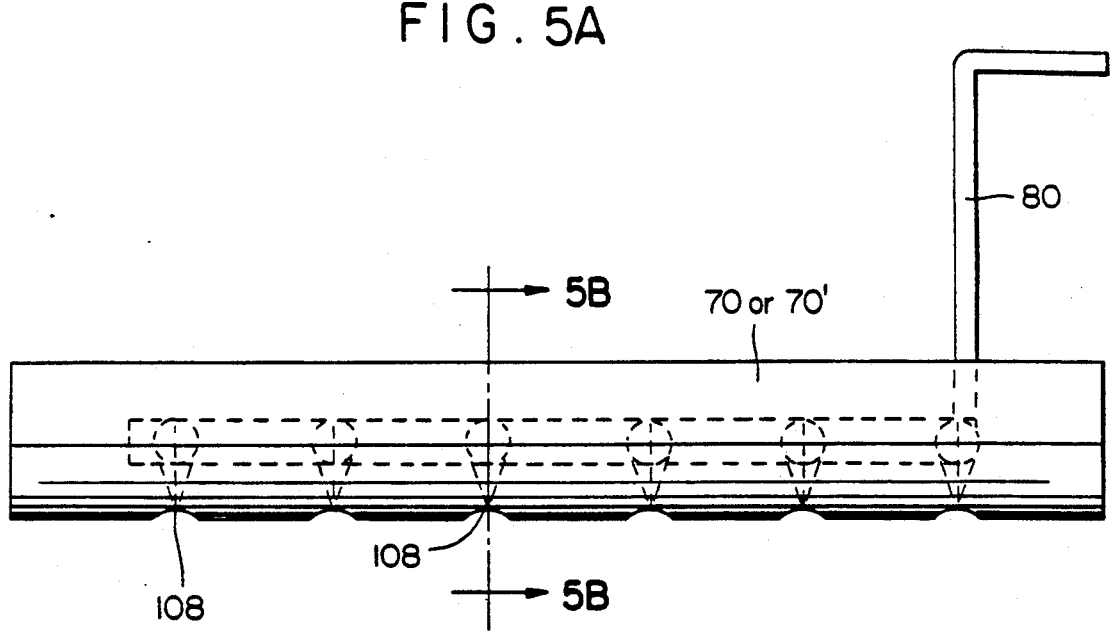
FIG. 5A is an enlarged, schematic, partial view of an apertured spray tube-type coating mechanism as shown in FIG. 3.
Figure 5B:
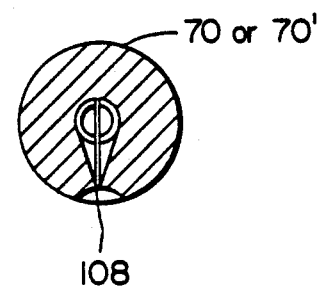
FIG. 5B is a cross-sectional view taken along the lines 5B—5B in FIG. 5A.
Figure 6:
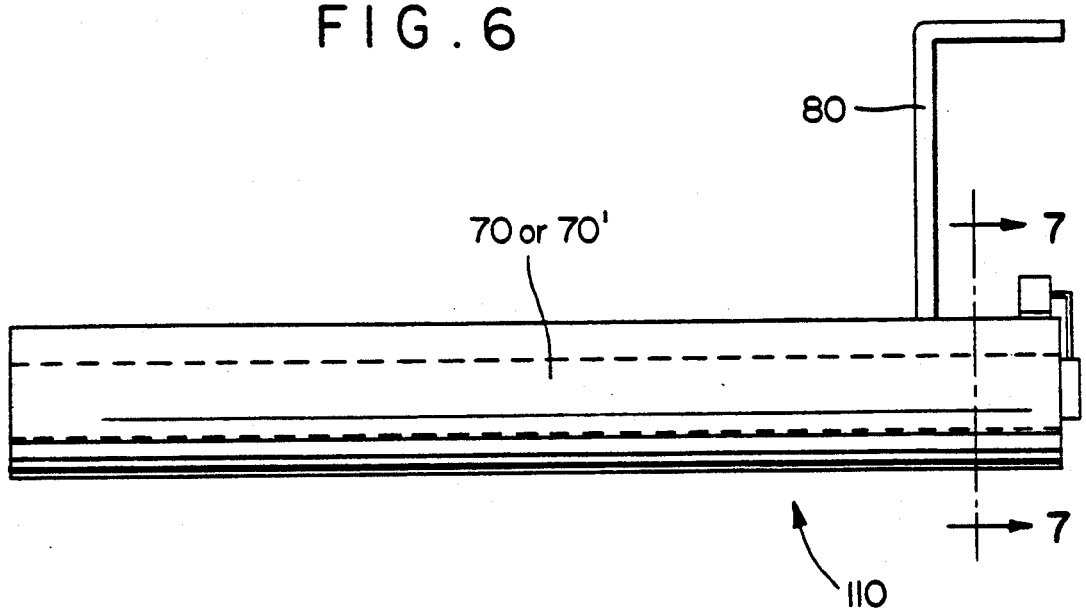
FIG. 6 is an enlarged, schematic, partial view of a slot-type coating mechanism.
Figure 7A:
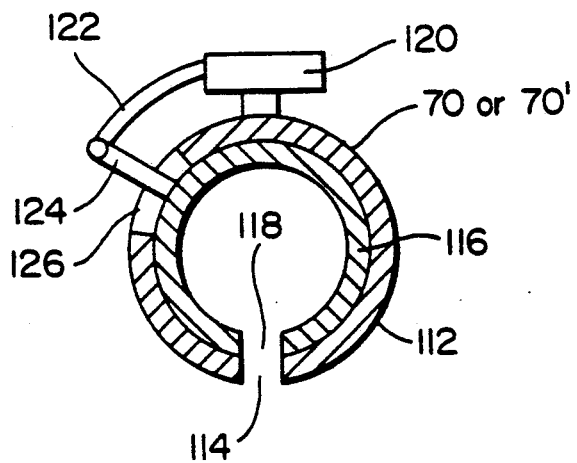
FIGS. 7A and 7B are schematic cross-sectional views taken along the line 7—7 in FIG. 6 showing different operating conditions.
Figure 7B:
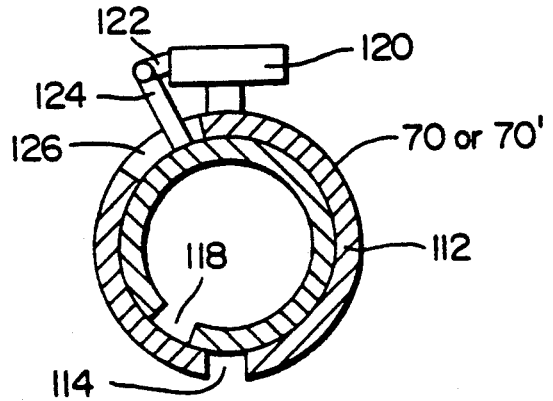

As is illustrated in FIGS. 5A and 5B, each of the spray tubes 70 or 70' may include a row of spraying apertures 108 extending along a lower portion thereof, with the liquid medium flexible inlet tube 80 connected to the spray tube adjacent one end thereof. In the alternative, referring to FIGS. 6, 7A and 7B, each of the spray tubes 70 or 70' may be in the form of a cylinder assembly 110 comprising an outer cylinder 112 provided with an elongated slot 114, and an inner cylinder 116 also provided with an elongated slot 118. The inner cylinder 116 is rotatable relative to the outer cylinder 112 between a position in which the elongated slots 114 and 118 in the cylinders are aligned, as shown in FIG. 7A, for a spraying operation, and a relative position in which the slots are in a non-aligned closed position, as shown in FIG. 7B. For this purpose, a small solenoid 120 is fixedly mounted on the outer cylinder 112 and has an arc-shaped plunger 122 pivotally connected to an outer end of a lug 124 secured at its inner end to the inner cylinder 116, with the lug disposed for limited circumferential movement in a circumferentially extending slot 126 in the outer cylinder.

Referring again to FIG. 1, the liquid medium 26 for a liquid medium coating operation is intermittently provided to the spray tube 70 by the liquid medium withdrawing-and-feeding mechanism 40. For this purpose, as is illustrated by the spray tube inlet line 80, the inlet line is connected to a manifold 128, in turn connected by feed lines 130 and 131 and respective control valves 132 and 134 to a double acting piston-and-cylinder mechanism 136. A cylinder 138 of the double acting piston-and-cylinder mechanism 136 is connected by additional feed lines 140, through control valves 142 and 144, to a liquid medium sump portion adjacent the bottom of the liquid medium container 24. A double acting piston 146 of the piston-and-cylinder mechanism 136 is reciprocated by a solenoid 148, so that, upon selective operation of the valves 132, 134, 142 and 144, when the piston is moved in one direction (e.g., to the left in FIG. 1) with the valves 132 and 144 open and the valves 134 and 142 closed, the liquid medium 26 in the cylinder 138 will be forced from the cylinder through the valve 132, the feed line 131, the manifold 128 and the inlet tube 80 to the spray tube 70. At the same time, with the valve 144 open and the valve 134 closed, additional liquid medium 26 will be withdrawn from the sump portion of the container 24 into the opposite end of the cylinder 138. Then, upon a next liquid medium coating operation, when the solenoid 148 is operated to move the piston 136 in the opposite direction (i.e., to the right in FIG. 1), with the valves 134 and 142 open and the valves 132 and 144 closed, the liquid medium 26 which was withdrawn into the cylinder 138 on the previous coating operation, will be fed from the cylinder through the valve 134, the feed line 130, the manifold 128 and the inlet tube 80, to the spray tube 70.

With further reference to FIG. 1, the liquid level raising mechanism 38 comprises an expandable member, such as a bellows 150, disposed in the bottom of the liquid medium container 24. One end of the bellows 150 is connected by an inlet line 152 extending through a lower wall portion of the container 24, and a control valve 154, to a fluid pressure source, such as air or water, not shown. Accordingly, when the control valve 154 is opened, the bellows 150 is expanded by the fluid pressure an incremental amount in order to raise the level of the liquid medium 26 in the container 24 a corresponding incremental amount (e.g., 00017" to 0.020") above the upper surface of the apertured article support plate 28 in the container for an article layer forming operation. For this purpose, the liquid medium level sensor 36 on the vertically movable scanning mechanism 32, operates when the desired liquid medium incremental level above the surface of the support plate 28 has been reached, to cause closing of the bellows control valve 154. This expansion of the bellows 150 is repeated for subsequent article layer forming operations until forming of the article 22 has been completed and the upper surface of the bellows has reached an upper level. A drain line 156 with a valve 158, which also is Connected to the bellows 150, then may be opened to drain the expansion fluid therefrom, whereupon the bellows returns to its original un-expanded condition, as shown in solid lines in FIG. 1, and the liquid medium 26 in the container 24 is returned to its original lower position in the reservoir or sump 25, thus draining and lowering the level of the liquid medium in the container to remove the liquid medium from around the formed article 22a or 22b while the article is on the apertured fixed support plate 28. During this liquid medium draining and lowering operation, any extraneous solidified material in the article-forming upper portion of the container 24 is removed by a filter 160 disposed in an opening 162o a horizontal plate 162 secured to the interior walls of the container and the drained liquid medium 26 then can be reused. Thus, it is apparent that the container tank portion 24T, reservoir 25, dispensing mechanism 70 (or 70'), withdrawing-and-feeding mechanism 40 (including tube 80) and the portion of the liquid medium draining system comprising the apertured support plate 28 and the filter opening 162o in the container horizontal plate 162, form a closed-loop, recirculating flow path for the liquid medium 26.

Figure 8:
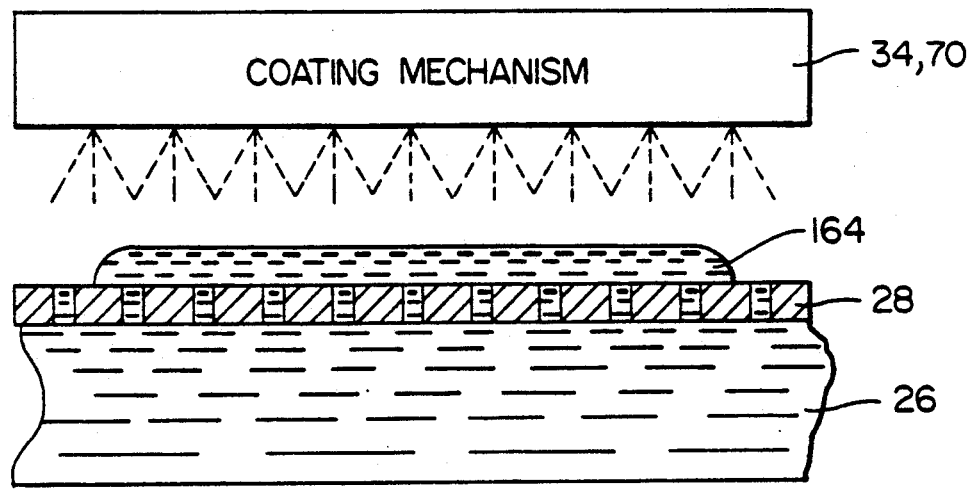
FIGS. 8 through 13 are elevational schematic views illustrating a sequence of steps in the forming of the solid three-dimensional article, in accordance with the invention.
Figure 9:
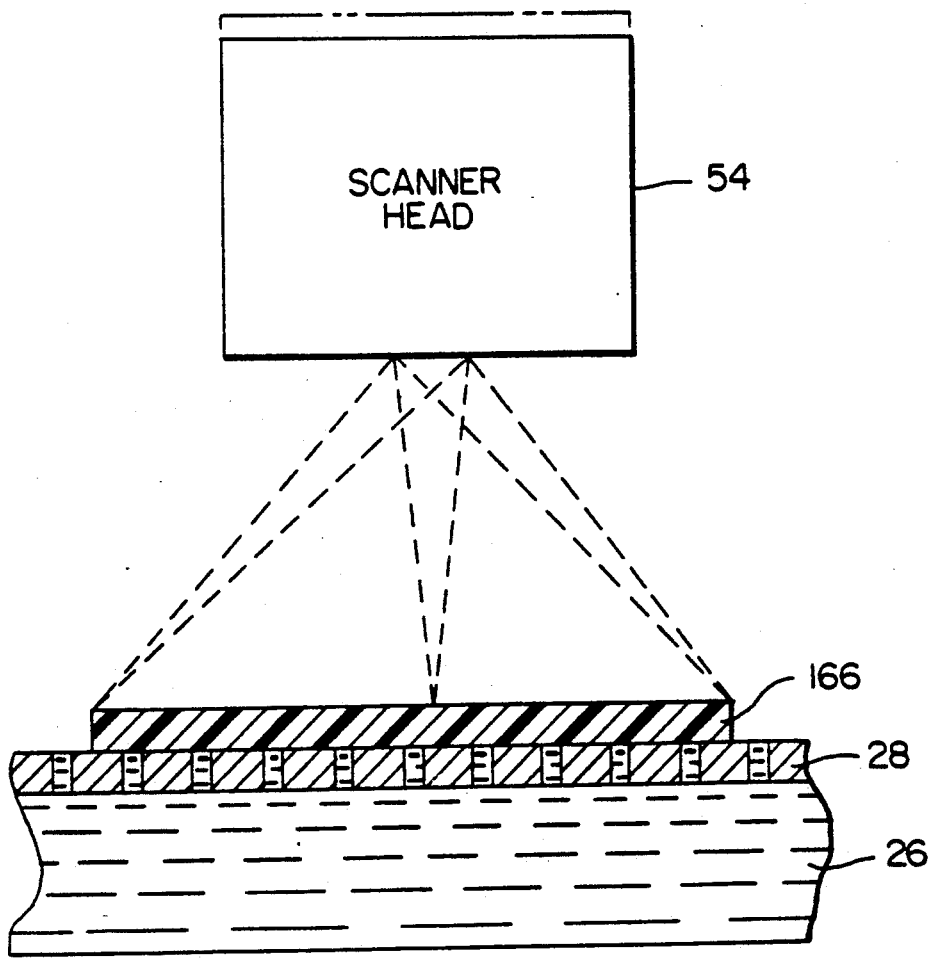
Figure 12:
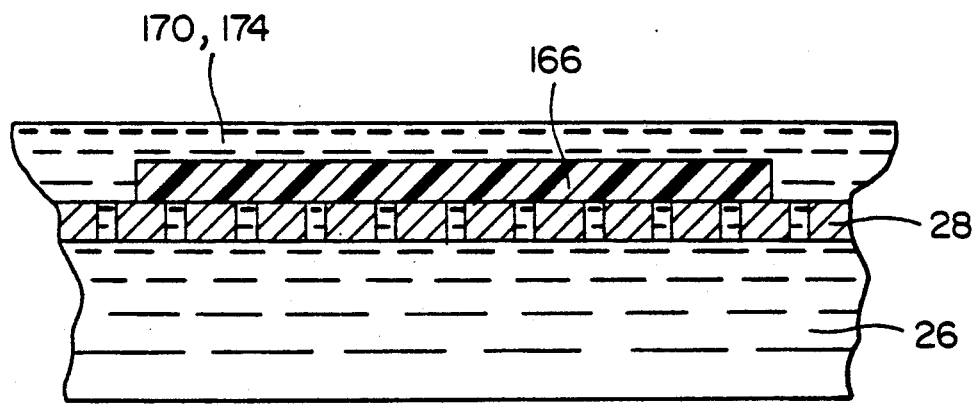
Figure 13:
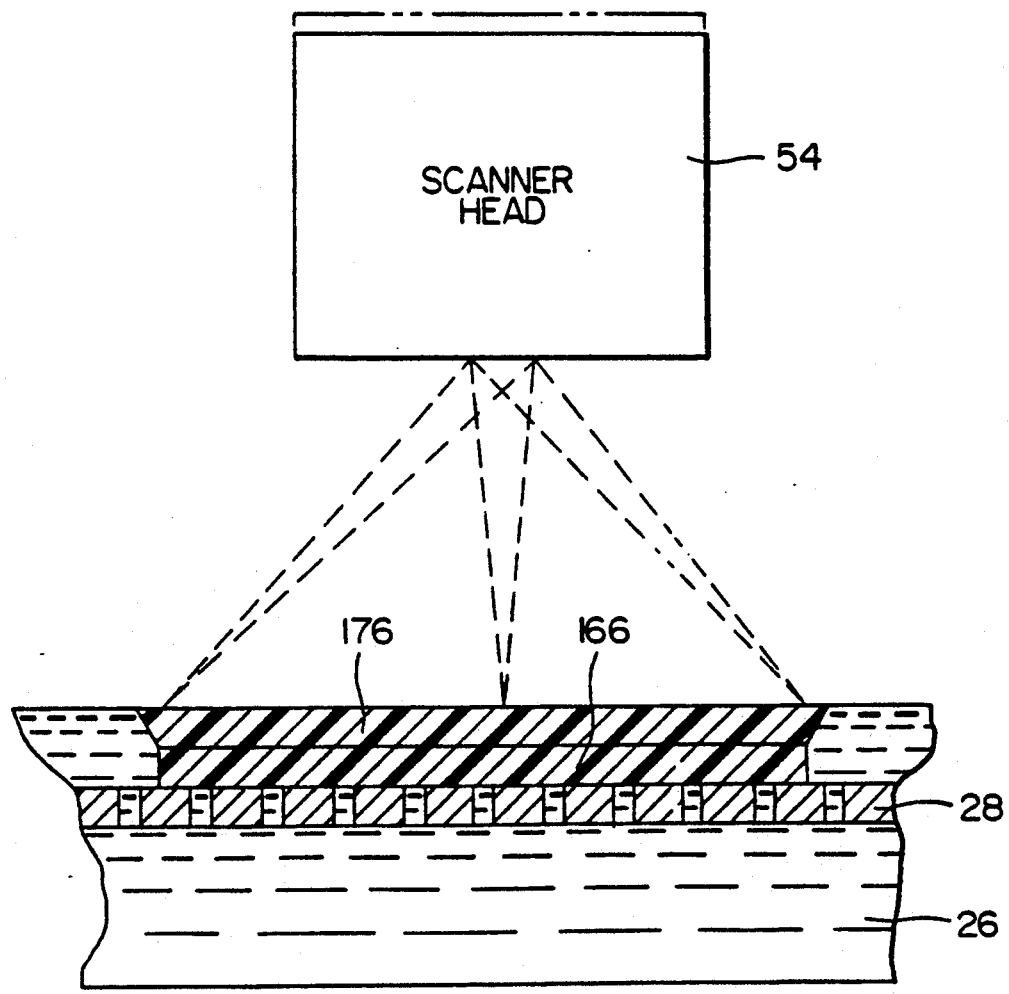
Figure 14:
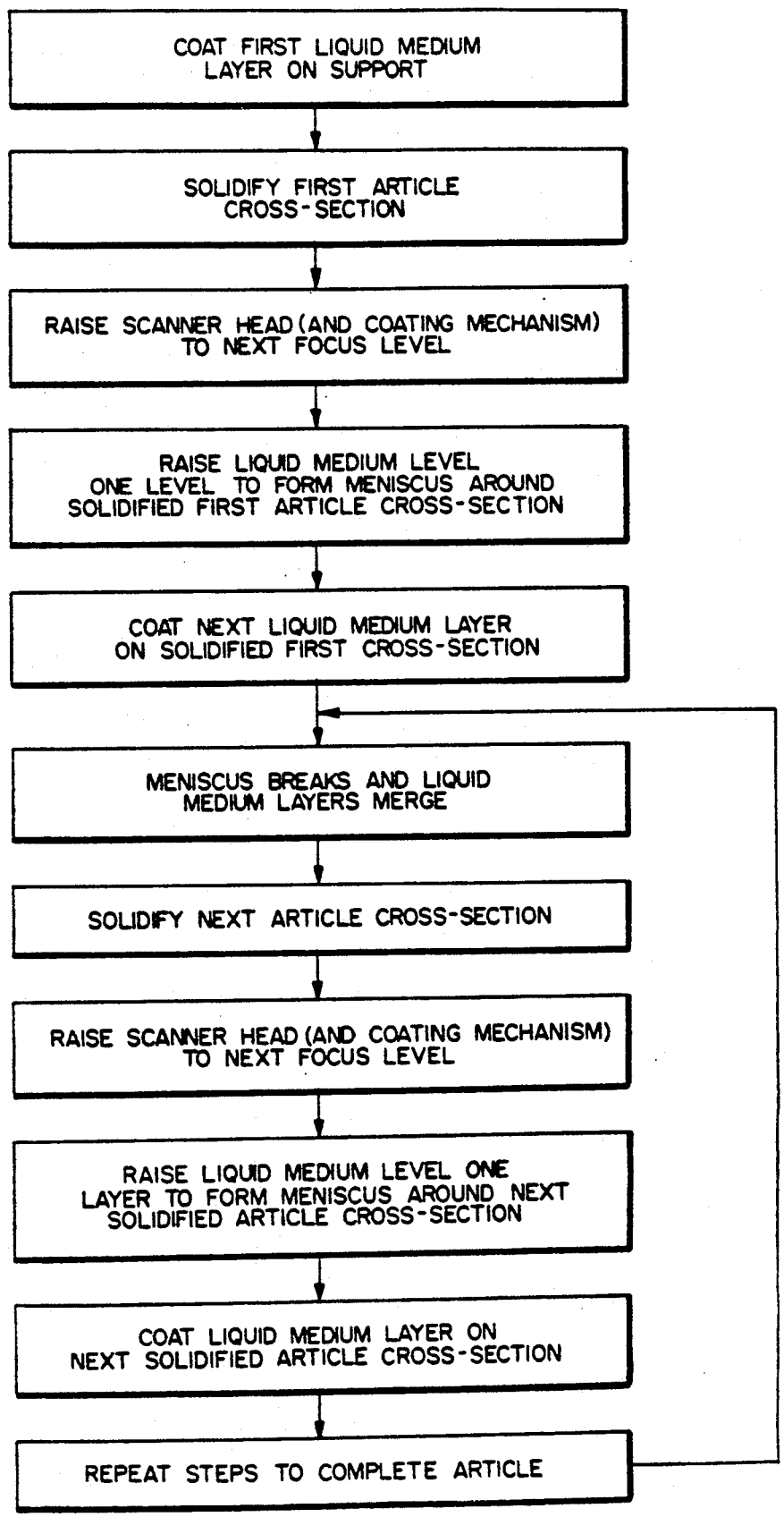
FIG. 14 is a block diagram further illustrating the sequence of steps shown in FIGS. 8 through 13.
Figure 16:
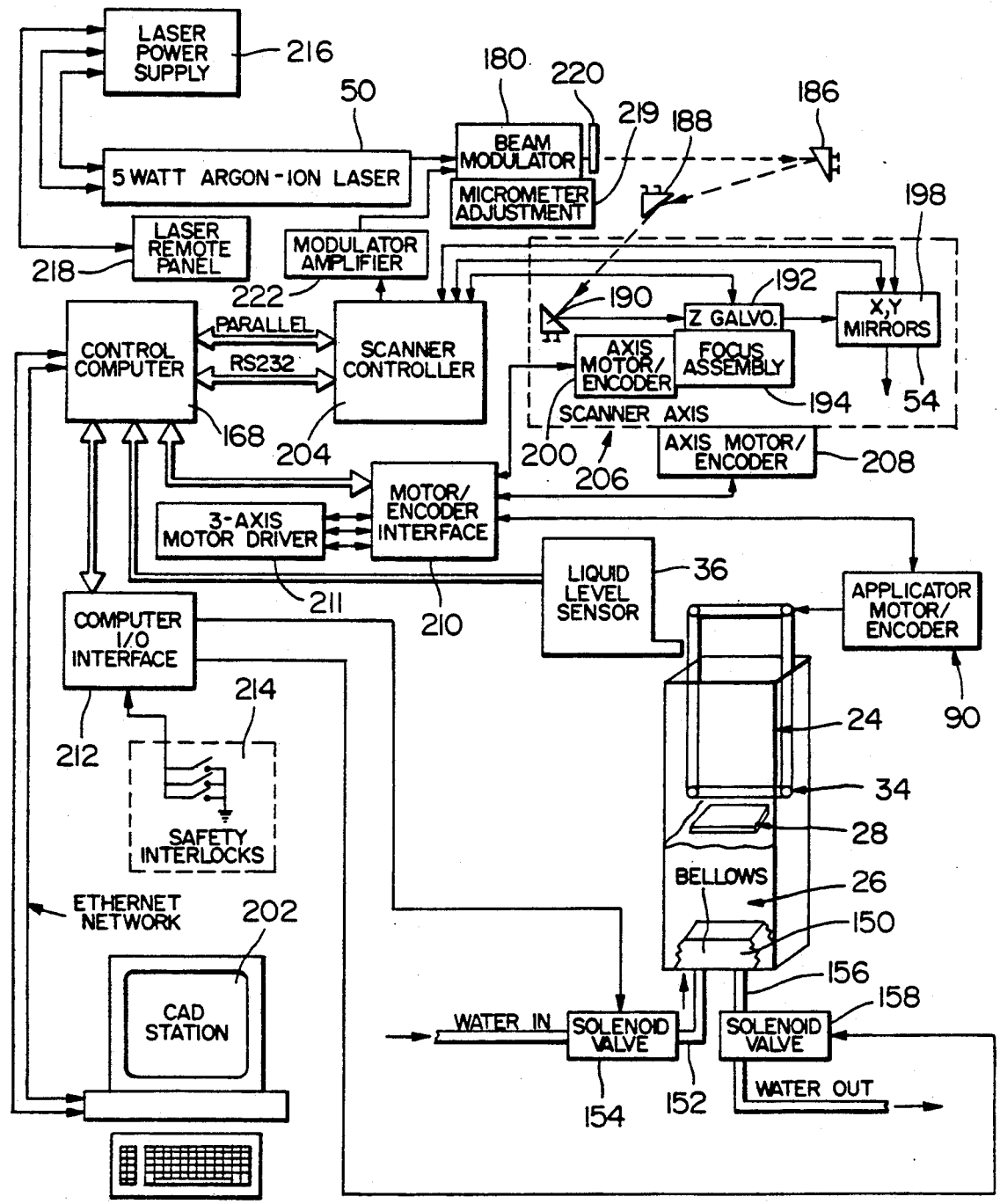
FIG. 16 is a block diagram of a system for carrying out the invention.

FIGS. 8-13 are schematic illustrations depicting a series of steps in carrying out the method of the invention, and FIG. 14 is a block diagram summarizing the steps illustrated in FIGS. 8-13. With reference to FIG. 8, initially, a first layer 164 of the liquid medium 26 is applied to the apertured support plate 28 from above the fixed support plate member 28 in the container 24, by way of example, by spraying from the spray-coating tube 70. Referring to FIG. 9, a preselected cross-section or profile 166 of the initial liquid medium layer 164, in accordance with a design of the solid three-dimensional article 22 being formed then is solidified by the scanner head 54 applying the laser beam energy from the laser 50 to the liquid medium layer under the direction of a computer 168 (FIG. 16). After the preselected cross-section 166 of the liquid medium layer 164 has been solidified, the scanning mechanism 32, including the scanner head 54-coating mechanism 34, is moved vertically an increment corresponding to the thickness of the next layer to be solidified, (e.g., 0.0017" to 0.020") as illustrated by the phantom lines in FIG. 9.

Figure 10:
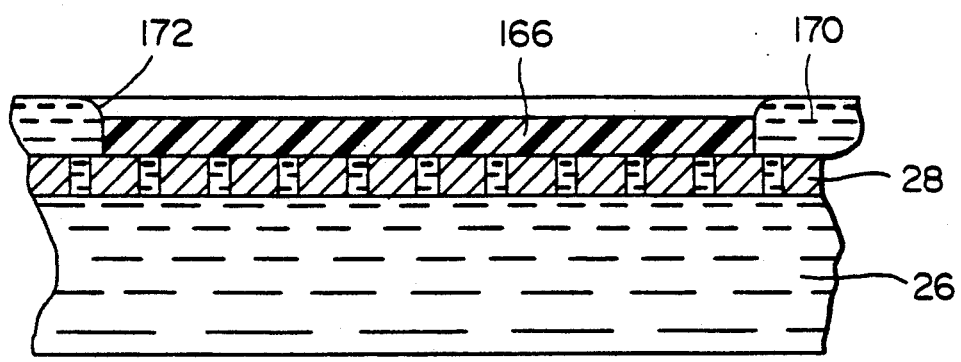
Figure 11:
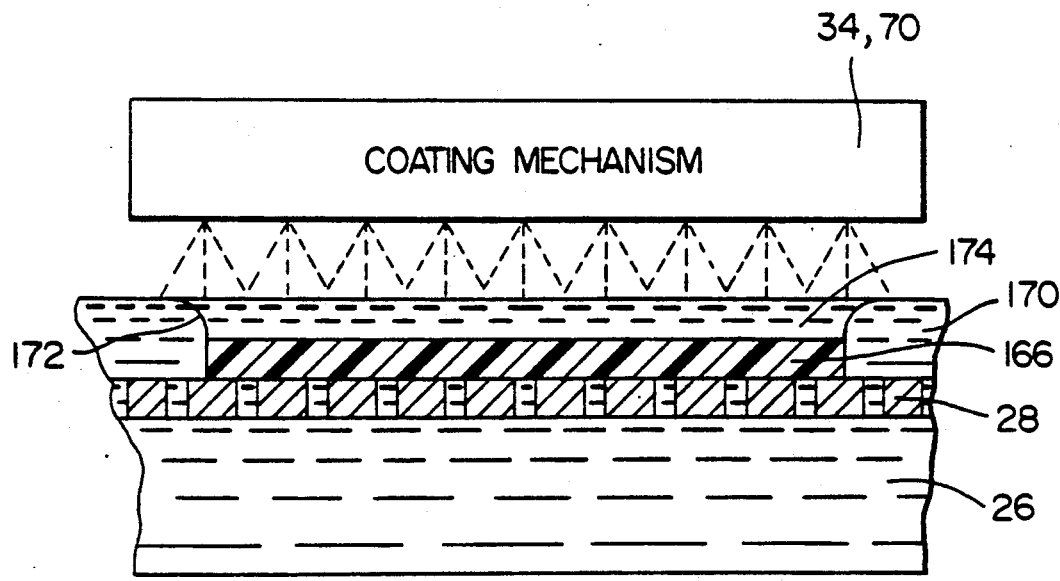

Referring to FIGS. 1 and 10, the fluid inlet valve 154 (FIG. 1) to the bellows 150 then is opened under the direction of the computer 168, to cause an incremental expansion of the bellows, to raise the level of the liquid medium 26 in the container 24 upward through the apertures in the article support plate 28, the preselected increment (e.g., 0.0017" to 0.020"), so that the surface tension of the thus-formed elevated layer 170 of the liquid medium 26 forms a meniscus 172 around the perimeter of the previously solidified article cross-section 166, without the liquid medium flowing over the upper surface of the solidified cross-section. Referring to FIG. 11, the upper surface of the initial solidified cross-section 166 of the article then is spray-coated by the spray tube 70 from above the fixed support 24 in the container 24, to fill the recess formed by the meniscus 172 above the upper surface of the solidified article cross-section, with an additional layer 174 of the liquid medium 26. The spraying operation causes the meniscus 172 surrounding the article cross-section 166 to break, whereby the layers 170 and 174 of liquid medium 26 merge, as illustrated in FIG. 12, thus completing the raising of the liquid level in the container 24 by a one-layer increment. With reference to FIG. 13, the scanner head 54 then is again operated to solidify another preselected cross-section or profile 176 of the article 22 being formed, under the direction of the computer 168, to form the next layer of the article. The liquid medium level raising step, liquid medium coating-and-meniscus breaking step and liquid medium solidifying step and scanner head-coating mechanism raising step, as represented by the steps 4, 5, 6, 7 and 8, and depicted in FIGS. 10, 11, 12 and 13, then are repeated, as necessary, until formation of the article 22 is completed.

Figure 5C:
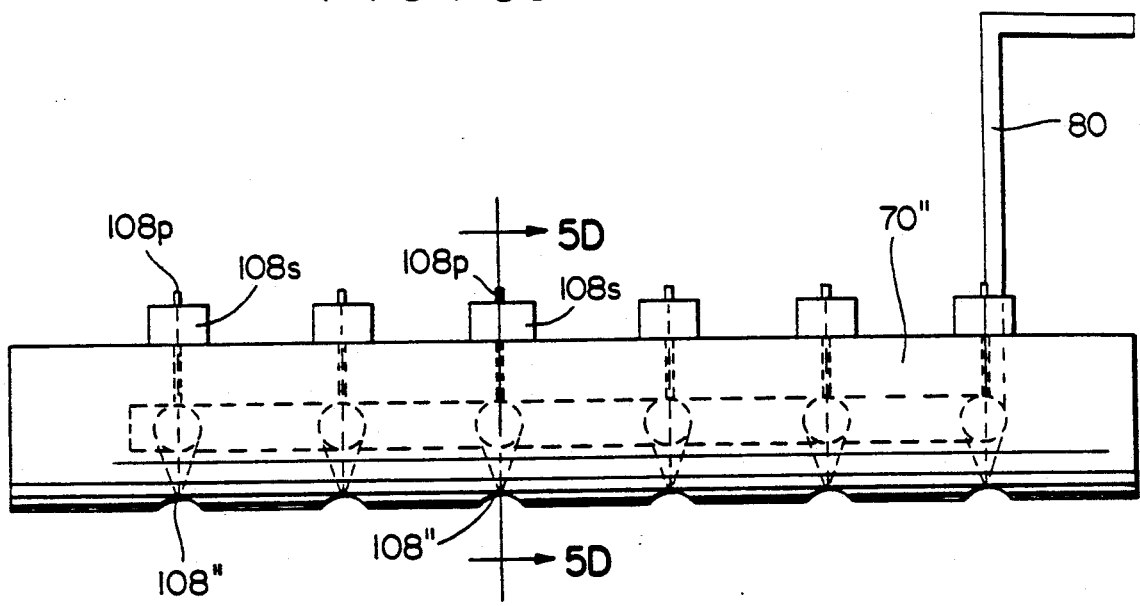
FIG. 5C is an alternate spray tube construction.
Figure 5D:
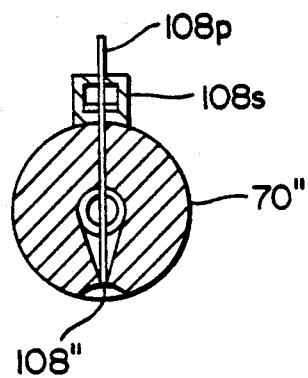
FIG. 5D is a cross-sectional view taken along the line 5D—5D in FIG. 5C.

In coating each of the solidified layers 166 and 176 of the liquid medium 26, it has been found that overspray of the liquid medium beyond the meniscus 172 onto the existing liquid medium, generally does not appear to produce a significant tolerance error in the finished article 22. While the reasons for this are not fully understood, it is believed to be due, at least in part, to the thinness of the liquid medium layers 16 and 17 involved. However, where tolerance variations are found to be a problem in any particular instance, a modified spray tube, as shown in FIGS. 5C and 5D may be used. In this embodiment, each spray aperture 108" is provided with a separate control pin 108p operated by a solenoid 108s. Thus, by programming the computer 168 to control the solenoids 108s so that the spray tube 70" begins spraying only at one extreme end portion of a meniscus, sprays only those areas within the confines of the meniscus during travel of the spray tube, and stops spraying at an opposite extreme end portion of the meniscus, closer tolerances can be obtained. The coating tube 70 or 70' of FIGS. 6, 7A and 7B may be used in a similar manner by dividing the inner cylinder 116 into relatively movable sections and providing each section with a respective control solenoid 120.

Figure 15:
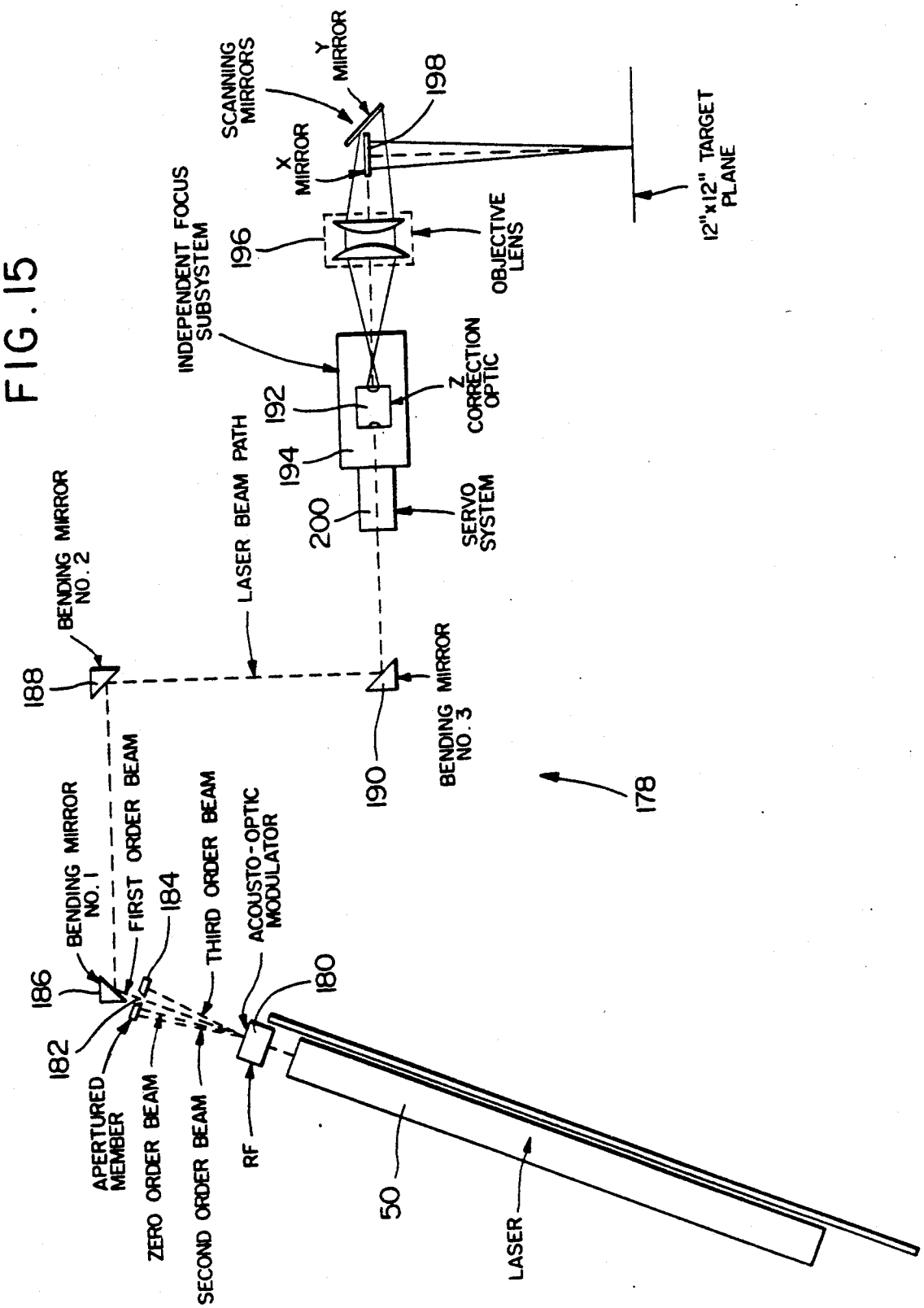
FIG. 15 is a schematic illustration of an optics system which may be used in practicing the invention.

FIG. 15 discloses an optic system 178 which may be used in practicing the invention as disclosed in FIGS. 1-14. The laser beam of the laser 50 is directed through an acousto-optic modulator 180 in the form of a rotatable piezoelelectric crystal which splits the beam into several orders of magnitude and which also can be used as a beam shutter in a known manner. A first order beam then passes through an aperture 182 in a member 184 to a series of bending mirrors 186, 188 and 190, and through an adjustably movable Z-axis correction focusing lens 192 on a reciprocal carriage 194, and an objective lens 196, to X and Y scanning mirrors 198 of the scanner head 54, which direct the beam so that it scans across the layer of liquid medium to be solidified. For this purpose, the correction lens 192 is focused so that a preselected diameter of the laser beam impinges upon the liquid medium layer, and the computer 168 is programmed to vary the position of the carriage 194, and thus the focusing lens 192, by a suitable servo system 200, "on the fly", during the solidification operation, so that the impinging diameter of the laser beam remains constant as the beam is directed toward the liquid medium at a direction other than perpendicular.

Referring to the block diagram of FIG. 16, it is seen that apparatus for practicing the invention includes a CAD station 202 which is connected by an ethernet network to the control computer 168 in a known manner. The computer 168 is connected through a scanner controller 204 to a scanner head access system 206 including an axis motor/encoder 208, the Z-axis galvanometer 192, the X and Y mirrors 198 of the scanner head 54, and the focusing assembly 194. The computer 168 is also connected to the applicator motor/encoder 90, for the liquid medium applicator (coater mechanism) 34 through a motor/encoder interface 210 having a 3-axis motor driver 212 connected thereto, and is also connected to the applicator motor/encoder 90, the focus axis motor/encoder 200, and scanner axis motor/encoder 208. The solenoid valve 154 for controlling fluid input to the bellows 150, and the drain valve 158 for the bellows, also are controlled by the computer 168 through a computer I/O interface 212, with safety interlocks 214 (e.g., open door, etc.) also connected to the computer 168 through the computer I/O interface.

With further reference to FIG. 16, the laser 50 is connected to an associated power supply 216, in turn connected to a control panel 218 in a known manner. The beam of the laser 50 is directed therefrom to the beam modulator 180 having a linear and rotary micrometer adjustment system 218 and a mechanical safety shutter 220. The micrometer adjustment system 218 of the beam modulator 180 is utilized to select and direct the lower order portion of the laser beam to the first bending mirror 186, as shown in FIG. 15 and previously described, from which the laser beam passes to the second and third bending mirrors 188 and 190, and then to the Z-axis galvanometer 192 of the focusing assembly 194, and to the scanner head X, Y mirrors 198 for a scanning (liquid medium solidifying) operation. The laser beam modulator 180 also is connected to a modulator amplifier 220 which receives signals from the scanner controller 204.

The control equipment as disclosed in FIG. 16 is of a type which is generally known in the art. For example, the computer 168 may be the model "Smart Micro 386/120" available from Microsmart, Inc. of Ashland, Mass. The CAD station 202 may be obtained from Sun Microsystems of Mountain View, Calif., under the trademark "Sparkstation", and software may be obtained from Structure Dynamic Research Corporation of Cincinnati, Ohio as their "Ideas for Design". Similarly, the laser 50 may be the 5 watt argon-ion laser sold by Coherent, Inc. of Mountain View, Calif. as their model "I-70"; the scanner head 54 may be obtained from General Scanning, Inc. of Watertown, Mass.; and the laser sensor 36 may be that sold by Namco Controls of Mentor, Ohio, under the trademark "Lasernet ®".

The liquid medium 26 may be of any suitable type capable of being solidified when subjected to prescribed energy, such as a laser beam. For example, the liquid medium may be a UV polymer acrolite thermoset photosensitive plastic resin such as that available from DeSoto, Inc. of Chicago, Ill. under the trademark "Desolite ®", or a suitable ceramic liquid. Other suitable materials will be apparent to those skilled in the art.

Figure 17:
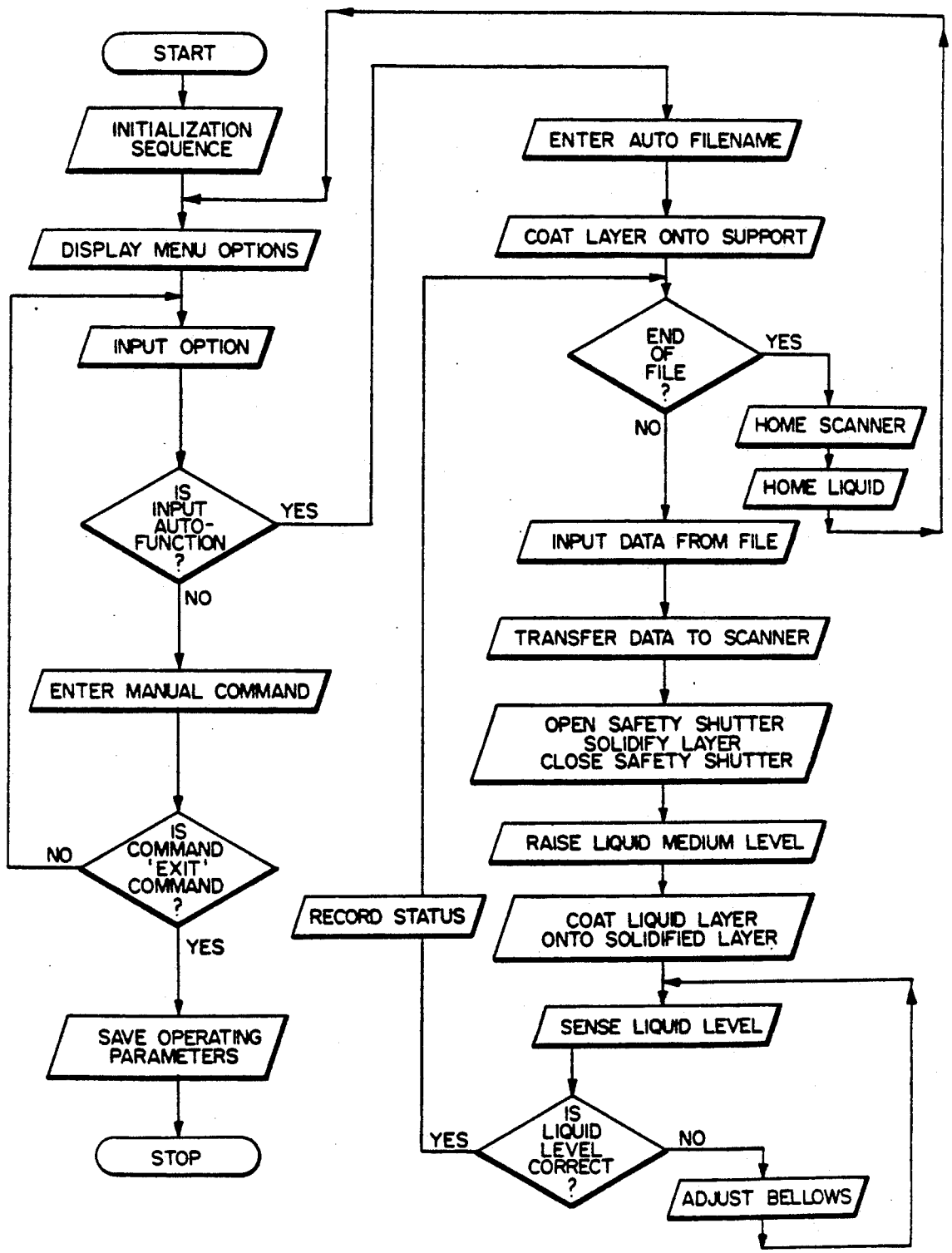
FIG. 17 is a flow chart illustrating a sequence of programming steps utilized in carrying out the invention.

FIG. 17 is a flow chart of a sequence of operations of the apparatus 20 in accordance with the invention, in the forming of a solid three-dimensional article 22 from the liquid medium 26. At the beginning of a forming operation, the apparatus 20 proceeds through an initialization sequence, in which the computer 168 determines the then-existing position settings of the various units of the apparatus, applies power to all units, returns the units to their "home" positions, as necessary, and calibrates the scanner system 32. The computer 168 then displays the various available menu options and the operator selects one of the options. If the input option is not automatic, the operator then executes the desired manual command, such as "jog the scanner head up", whereupon, unless the command is an "exit" command, the computer 168 displays another input option for selection by the operator. If the command is an "exit" command, the computer 168 stores the positions of the various units of the system for the next operation, and the apparatus 20 is turned off.

If the input option selected by the operator is automatic, the computer 168 enters an automatic file name (e.g., the name of an article 22 to be formed) for processing. If the next cross-section or profile of the article 22 to be formed is other than the last cross-section, that is, the end of the file, the computer 168 then inputs information for the cross-section to be formed, and transfers the data to the scanner system 54. If a layer of the liquid medium 26 has been coated in a solidifying operation, the safety shutter 56 beneath the horizontal plate of scanning system 32 is opened and the cross-section of the article to be formed is scanned and solidified by the scanner system 32. After solidification of the cross-section has been completed and the safety shutter 56 has been closed, the scanner system is raised one increment by the lift mechanism 44, and the bellows 150 is operated to expand an additional increment to raise the liquid medium level a desired amount, as sensed by the liquid medium level sensor 36, to form a meniscus 172 around the just-solidified profile as illustrated in FIG. 10. If the liquid medium level sensor 36 does not operate, the bellows 150 is again operated an additional increment until operation of the liquid medium sensor occurs. The status of the forming operation, i.e., that the cross-section has been formed and that the system is ready to form the next cross-section, then is recorded in the computer 168, and the sequence of operations is repeated.

However, if the computer 168 determines that the last sequence of operations was the last cross-section for the article 22 being formed, i.e., the end of the file, the scanner system 32 then is raised upward to its upper "home" position by the lift mechanism 44, and the drain valve 158 of the bellows 150 is opened by the computer 168 to permit the liquid medium 26 in the container 24 to be lowered to its "home" position, to permit access to the completed article 22 and removal therefrom from the apertured support plate 28 in the container 24, as well as removal and/or cleaning of the support plate for the next article forming operation.

In summary, a new and improved method of and apparatus for forming a solid three-dimensional article 22, such as the articles 22a and 22b in FIGS. 18a and 18b, respectively, from a liquid medium, has been disclosed. The method and apparatus involves initially coating a layer of the liquid medium 26 onto the apertured support plate 28 in the liquid medium container 24, as illustrated in FIG. 8. An initial cross-section or profile 66 of the article 22 then is formed by solidifying the liquid medium 26, as illustrated in FIG. 9, and the scanner mechanism 54 is raised one increment. Next, the liquid level of the liquid medium 26 is raised by operation of the bellows 150, to form the meniscus 172 around the solidified cross-section or profile 166 of the article 22, as illustrated in FIG. 10. Another coating of the liquid medium 26 then is applied to the solidified cross-section or profile 166 of the article 22 within the recess defined by the meniscus 172, as shown in FIG. 11, causing the meniscus to break and the liquid medium layers 170 and 174 to merge, as shown in FIG. 12 A next cross-section or profile of the article 22 then is solidified by the scanning system 32, as illustrated in FIG. 13, and the scanner head 54 is again raised an additional increment. This sequence of operations then is continued until all of the cross-sections or profiles of the article 22 being formed have been completed. The scanning system 32 then may be raised to its upper "home" position by the lift mechanism 44, and the drain valve 158 for the bellows 150 opened to permit lowering of the liquid medium 26 in the container 24 to its lowermost "home" position, to permit access to the completed article 22 and removal of the article from the apparatus 20. The disclosed method and apparatus are particularly advantageous from the standpoint of forming the solid three-dimensional articles 22 from the liquid medium 26 in a rapid and expeditious manner, with a minimum of waste in time and material.

What is claimed is:

1. Apparatus for forming a solid three-dimensional article from a liquid medium capable of solidification when subjected to prescribed energy, which comprises:
   container means for holding the liquid medium;
   support means in the container means for supporting the solid three-dimensional article being formed;
   means for forming a first cross-section of the liquid medium on the support means;
   means for solidifying a preselected cross-section of the first cross-section of the liquid medium, to form a first layer of the solid three-dimensional article;
   means for raising the level of the liquid medium in the container means surrounding the solidified first cross-section of the article so as to form a meniscus around the periphery of the first cross-section;
   horizontally reciprocating means for coating a second cross-section of the liquid medium directly onto the solidified first cross-section of the solid three-dimensional article so as to fill the meniscus with the liquid medium from above and so that the meniscus surrounding the solidified first cross-section is broken and the second cross-section of the liquid medium and the liquid medium surrounding the second cross-second flow together and form an essentially level surface;
   said solidifying means then being operative to solidify a second preselected cross-section of the liquid medium, to form a second layer of the solid three-dimensional article; and
   said liquid medium level raising means, coating means and solidifying means then being repetitively operated in sequence, as necessary, to complete the solid three-dimensional article.

2. Apparatus as recited in claim 1, wherein the support means is fixed in position in the container means.

3. Apparatus as recited in claim 2, wherein the support means is an apertured plate fixedly mounted in the container means.

4. Apparatus as recited in claim 1, wherein the support means is an apertured plate.

5. Apparatus as recited in claim 1, wherein the coating means is a spraying means.

6. Apparatus as recited in claim 1, wherein the coating means is a horizontally extending elongated apertured tube.

7. Apparatus as recited in claim 1, wherein the coating means comprises:
an outer elongated cylinder and inner elongated cylinder mounted in relatively rotatable coaxial relationship, each cylinder including an elongated slot; and
means for causing relative rotation between the cylinders to cause relative movement of the elongated slots between a non-aligned closed position and an aligned coating position.

8. Apparatus as recited in claim 1, which further comprises:
gear rack means for supporting the coating means for the horizontal reciprocating movement above the support means; and
drive means for reciprocating the coating means on the gear rack means.

9. Apparatus as recited in claim 1, wherein the coating means is mounted for oscillating swinging movement above the support means, and means are provided for oscillating the coating means.

10. Apparatus as recited in claim 1, which further comprises:
means for intermittently withdrawing a portion of the liquid medium from a lower portion of the container means and feeding the withdrawn liquid medium to the coating means.

11. Apparatus as recited in claim 10, wherein the liquid medium withdrawing and feeding means includes a double acting piston in a cylinder and valve means for controlling flow of the liquid medium to and from the piston and cylinder.

12. Apparatus as recited in claim 1, wherein the liquid level raising means is an expandable member in a bottom portion of the container means.

13. Apparatus as recited in claim 12, wherein the expandable member is expandable in response to fluid pressure.

14. Apparatus as recited in claim 1, wherein the solidifying means and the coating means are mounted for vertical movement relative to the support means.

15. Apparatus as recited in claim 14, wherein the support means is an apertured plate fixed in position in the container means.

16. Apparatus as recited in claim 15, wherein:
means is provided for intermittently withdrawing a portion of the liquid medium from a lower portion of the container means and feeding the liquid medium to the coating means.

17. Apparatus as recited in claim 16, wherein the liquid medium solidifying means includes a laser.

18. Apparatus for forming a solid three-dimensional article from a liquid medium capable of solidification when subjected to prescribed energy, which comprises:
container means for holding the liquid medium;
fixed support means in the container means, for supporting the solid three-dimensional article being formed;
means for producing a layer of the liquid medium in the container means above the fixed support means;
laser means for solidifying a preselected cross-section of such layer in accordance with a design for the three-dimensional article;
means for alternately and repetitively operating said liquid medium layer-producing and laser solidifying means, as necessary, to form the solid three-dimensional article; and
means for reducing the level of unsolidified liquid medium within the container means from around the formed three-dimensional article while on the fixed support means.

19. Apparatus as recited in claim 18, which further comprises means for dispensing at least a portion of each liquid medium layer from above the fixed support means in the container means.

20. Apparatus as recited in claim 19, wherein the dispensing means includes a horizontally reciprocable, elongated apertured tube.

21. Apparatus as recited in claim 19, wherein the dispensing means comprises:
an outer elongated cylinder and an inner elongated cylinder mounted in relatively rotatable coaxial relationship, each cylinder including an elongated slot; and
means for causing relative rotation between the cylinders to cause relative movement of the elongated slots between a non-aligned closed position and an aligned dispensing position.

22. Apparatus as recited in claim 19, wherein the dispensing means is mounted for horizontal reciprocating movement above the support means.

23. Apparatus as recited in claim 22, which further comprises:
gear rack means for supporting the dispensing means for the horizontal reciprocating movement above the support means; and
drive means for reciprocating the dispensing means on the gear rack means.

24. Apparatus as recited in claim 19, wherein the dispensing means is mounted for oscillating swinging movement above the support means, and means are provided for oscillating the dispensing means.

25. Apparatus as recited in claim 19, which further comprises:
means for intermittently withdrawing a portion of the liquid medium from a lower portion of the container means and feeding the withdrawn liquid medium to the dispensing means.

26. Apparatus as recited in claim 25, wherein the liquid medium withdrawing-and-feeding means includes a double acting piston in a cylinder, and valve means for controlling flow of the liquid means to and from the piston and the cylinder.

27. Apparatus as recited in claim 19, wherein at least one of the solidifying means and the dispensing means is mounted for vertical movement relative to the fixed support means in the container means.

28. Apparatus as recited in claim 19, wherein the solidifying means and the dispensing means both are mounted for vertical movement relative to the fixed support means in the container means.

29. Apparatus as recited in claim 28, which further comprises means for raising the solidifying means and the dispensing means simultaneously.

30. Apparatus as recited in claim 19, wherein the dispensing means is a horizontally extending, movable coating means.

31. Apparatus as recited in claim 18, wherein the layer-producing means raises the level of the liquid medium relative to the fixed support means in the container, means to produce each layer of the liquid medium.

32. Apparatus as recited in claim 31, wherein the layer-producing means includes means for dispensing at least a portion of each layer of the liquid medium from above the fixed support means in the container means.

33. Apparatus as recited in claim 31, wherein the layer-producing means includes:
   means for raising the level of the liquid medium so as to form a meniscus around the periphery of a previously solidified cross-sectional portion of the article, to form a portion of the respective layer of the liquid medium; and
   means for dispensing liquid medium onto the previously solidified cross-sectional portion above the fixed support means in the container means to form the remainder of the layer and so that the meniscus is broken and the liquid medium forms an essentially level surface.

34. Apparatus as recited in claim 18, wherein the fixed support means is an apertured plate which permits the passage of liquid medium therethrough.

35. Apparatus as recited in claim 18, wherein the liquid medium solidifying means includes a UV laser.

36. Apparatus as recited in claim 18, wherein the liquid medium solidifying means includes a visible light laser.

37. Apparatus as recited in claim 18, wherein the fixed support means is an apertured fixed support plate mounted at an intermediate level in the container means.

38. Apparatus as recited in claim 18, wherein said liquid medium level reducing means includes valve means for causing draining of said liquid medium from around the formed three-dimensional article.

39. Apparatus as recited in claim 18, which further comprises means for transferring the unsolidified liquid medium removed from around the article to said layer-producing means.

40. Apparatus as recited in claim 18, wherein said container means include a tank means within which the three-dimensional article is formed and a reservoir means for holding a supply of said liquid medium.

41. Apparatus as recited in claim 40, wherein said reservoir means is positioned below said tank means.

42. Apparatus as recited in claim 40, wherein said fixed support means is part of said tank means.

43. Apparatus as recited in claim 40, wherein said liquid medium can drain from said tank means into said reservoir means.

44. Apparatus as recited in claim 40, which further comprises means for transferring said liquid medium from adjacent a bottom of said reservoir means to said layer-producing means.

45. Apparatus as recited in claim 18, wherein said container means comprises:
   an upper container portion in which said solid three-dimensional article is formed from the liquid medium; and
   a lower container portion in which the liquid medium is stored.

46. Apparatus for forming a solid three-dimensional article from a liquid medium capable of solidification when subjected to prescribed energy, which comprises:
   container means for holding the liquid medium;
   support means mounted in a fixed position in the container means for supporting the solid three-dimensional article being formed;
   means for producing a layer of the liquid medium in the container means above the fixed support means in the container means, said layer-producing means including means for dispensing at least a portion of the liquid medium layer from above the fixed support means;
   means for solidifying a preselected cross-section of the produced layer of the liquid medium, to form a cross-sectional portion of the solid three-dimensional article;
   means for causing said liquid medium layer-producing and solidifying means to be alternately and repetitively operated in sequence, as necessary, to complete the solid three-dimensional article; and
   means for reducing the level of unsolidified liquid medium in the container means from around the formed three-dimensional article while on the fixed support means.

47. Apparatus as recited in claim 46, wherein the dispensing means is mounted for both horizontal and vertical movement relative to the fixed support means in the container means.

48. Apparatus for forming a solid three-dimensional article from a liquid medium capable of solidification when subjected to prescribed energy, which comprises:
   container means for holding the liquid medium;
   separate support means mounted in a fixed position above a bottom of the container means for supporting the solid three-dimensional article being formed and providing fluid communication between portions of the container means above and below the support means;
   means for producing a layer of the liquid medium in the container means above the fixed support means, said layer-producing means including dispensing means for dispensing liquid medium from above the three-dimensional article being made and means for intermittently withdrawing a portion of the liquid medium from a lower portion of the container means below the fixed support means and feeding the liquid medium to the dispensing means;
   means for solidifying a preselected cross-section of the produced layer of the liquid medium, to form a cross-sectional portion of the solid three-dimensional article;
   means for raising said solidifying means after solidification of the preselected cross-section of the liquid medium;
   means for causing said liquid medium layer-producing, solidifying and raising means to be alternately and repetitively operated in sequence, as necessary, to complete the solid three-dimensional article; and
   means for reusing unsolidified liquid medium from around the formed three-dimensional article.

49. Apparatus for forming a solid three-dimensional article from a liquid medium capable of solidification when subjected to prescribed energy, which comprises:
   fixed container means for holding the liquid medium;
   fixed support means in the container means, for supporting the solid three-dimensional article being formed;
   means for producing a layer of the liquid medium in the container means above the fixed support means, said layer-producing means including horizontally and vertically movable dispenser means of horizontally extending elongated construction for dispensing at least a portion of the liquid medium layer from above the fixed support means in the container means;

vertically movable laser means for solidifying a preselected cross-section of such layer in accordance with a design for the three-dimensional article;

means for raising said dispensing means after dispensing of the liquid medium, and for raising said laser solidifying means after solidification of the preselected cross-section of the liquid medium; and means for alternately and repetitively operating said liquid medium layer-producing, solidifying and raising means, as necessary, to form the solid three-dimensional article.

50. Apparatus as recited in claim 49, wherein said raising means raises said dispensing means and said solidifying means simultaneously.

51. Apparatus for forming a solid three-dimensional article from a liquid medium capable of solidification when subjected to prescribed energy, which comprises:

fixed container means for holding the liquid medium;

fixed support means in the container means, for supporting the solid three-dimensional article being formed;

horizontally movable means for dispensing at least a portion of such liquid medium from above the fixed support means for producing a layer of the liquid medium in the container means, said dispensing means comprising an outer elongated cylinder and an inner elongated cylinder mounted in relatively rotatable coaxial relationship, each cylinder including an elongated slot;

means for causing relative rotation between the cylinders of said dispensing means to cause relative movement of the elongated slots between a non-aligned closed position and an aligned dispensing position;

means for solidifying a preselected cross-section of the produced layer in accordance with a design for the three-dimensional article; and means for alternatively and repetitively operating said liquid medium layer-producing and solidifying means, as necessary, to form the solid three-dimensional article.

52. Apparatus for forming a solid three-dimensional article form a liquid medium capable of solidification when subjected to prescribed energy, which comprises:

container means for holding the liquid medium;

support means in the container means, for supporting the solid three-dimensional article being formed;

means for dispensing at least a portion of such liquid medium from above the support means for producing a layer of the liquid medium in the container means, gear rack means for supporting the dispensing means for horizontal reciprocating movement above the support means;

drive means for reciprocating the dispensing means on the gear rack means;

means for solidifying a preselected cross-section of the produced layer in accordance with a design for the three-dimensional article; and means for alternatively and repetitively operating said liquid medium layer-producing and solidifying means, as necessary, to form the solid three-dimensional article.

53. Apparatus for forming a solid three-dimensional article from a liquid medium capable of solidification when subjected to prescribed energy, which comprises:

container means for holding the liquid medium;

support means in the container means, for supporting the solid three-dimensional article being formed;

means for dispensing at least a portion of such liquid medium from above the support means for producing a layer of the liquid medium in the container means, said dispensing means being mounted for oscillating swinging movement above the support means;

means for oscillating the dispensing means;

means for solidifying a preselected cross-section of the produced layer in accordance with a design for the three-dimensional article; and means for alternatively and repetitively operating said liquid medium layer-producing and solidifying means, as necessary, to form the solid three-dimensional article.

54. Apparatus for forming a solid three-dimensional article form a liquid medium capable of solidification when subjected to prescribed energy, which comprises:

fixed container means for holding the liquid medium;

fixed support means in the container means, for supporting the solid three-dimensional article being formed;

means for intermittently dispensing at least a portion of such liquid medium from above the support means for producing a layer of the liquid medium in the container means;

means for solidifying a preselected cross-section of the produced layer, to form a layer of the solid three-dimensional article; and means for intermittently withdrawing a portion of the liquid medium from a lower portion of the container means and feeding the withdrawn liquid medium to the dispensing means to cause the intermittent dispensing of the liquid medium.

55. Apparatus as recited in claim 54, wherein said dispensing means is a horizontally extending elongated tube extending substantially parallel to said support means and mounted for horizontal reciprocable movement above said support means.

56. Apparatus as recited in claim 54, wherein the liquid medium withdrawing-and-feeding means includes an intermittently operated double acting piston in a cylinder, and valve means for controlling flow of the liquid medium to and from the piston and the cylinder.

57. Apparatus for forming a solid three-dimensional article from a liquid medium capable of solidification when subjected to prescribed energy, which comprises:

fixed container means for holding the liquid medium;

fixed support means in the container means, for supporting the solid three-dimensional article being formed;

elongated tube means for dispensing at least a portion of such liquid medium from above the fixed support means for producing a layer of the liquid medium in the container means, said elongated tube means extending horizontally and substantially parallel to said fixed support means;

means for supporting the elongated tube means for horizontal reciprocating movement above the fixed support means;

drive means for reciprocating the elongated tube means on the tube support means;

means for solidifying a preselected cross-section of the produced layer in accordance with a design for the three-dimensional article; and means for alternatively and repetitively operating said liquid medium layer-producing and solidifying means, as necessary, to form the solid three-dimensional article.

58. Apparatus as recited in claim 57, which further comprises:
mean for raising said tube support means and said drive means after the dispensing of the liquid medium, and for raising said solidifying means after solidification of the preselected cross-section of the liquid medium.

59. Apparatus as recited in claim 57, wherein said drive means comprises:
a drive motor mounted above the elongated tube dispensing means;
at least one rotatable drive shaft drivingly engaged with said support means for said elongated tube dispensing means and mounted above said fixed article support means; and
means for drivingly connecting said motor to said at least one rotatable drive shaft.

60. Apparatus as recited in claim 59, which further comprises:
means for raising said tube support means and said drive motor after the dispensing of the liquid medium, and for raising said solidifying means after solidification of the preselected cross-section of the liquid medium.

61. Apparatus as recited in claim 60, wherein said fixed support means is an apertured plate.

62. Apparatus as recited in claim 61, wherein said apertured plate is mounted at an intermediate level in said container means.

63. Apparatus as recited in claim 60, which further comprises means for intermittently withdrawing a portion of the liquid medium from a lower portion of the container means and feeding the withdrawn liquid medium to the dispensing means, to cause intermittent dispensing of the liquid medium.

64. Apparatus as recited in claim 63, wherein the fixed support means is an apertured plate.

65. Apparatus as recited in claim 64, wherein the apertured plate is mounted at an intermediate level in the container means.

66. Apparatus for forming a solid three-dimensional article from a liquid medium capable of solidification when subjected to prescribed energy, which comprises:
tank means for holding the liquid medium during forming of the solid three-dimensional article;
fixed means in the tank means for supporting the solid three-dimensional article being formed;
reservoir means for holding a supply of the liquid medium;
means for intermittently dispensing at least a portion of such liquid medium from above the support means for producing a layer of the liquid medium in the tank means;
means for solidifying a preselected cross-section of the produced layer, to form a layer of the solid three-dimensional article;
means for intermittently withdrawing a portion of the liquid medium from adjacent a bottom of said reservoir means and feeding the withdrawn liquid medium to the dispensing means, to cause the intermittent dispensing of the liquid medium; and
means for draining unsolidified liquid medium from the tank means back into the reservoir means,
said tank means, reservoir means, dispensing means, withdrawing-and-feeding means and draining means forming a closed-loop, recirculating flow path for said liquid medium.

67. Apparatus as recited in claim 66, which further comprises filter means for removing extraneous solidified material from the liquid medium as it circulates in the closed loop, recirculating flow path.

68. Apparatus for forming a solid three-dimensional article from a liquid medium capable of solidification when subjected to prescribed energy, which comprises:
tank means for holding the liquid medium during forming of the solid three-dimensional article;
a fixed support in the tank means for supporting the solid three-dimensional article being formed;
reservoir means positioned below said tank means for holding a supply of the liquid medium;
means for intermittently dispensing at least a portion of such liquid medium from above the support means for producing a layer of the liquid medium in the tank means;
means for solidifying a preselected cross-section of the produced layer, to form a layer of the solid three-dimensional article;
means for intermittently withdrawing a portion of the liquid medium from the reservoir means and feeding the withdrawn liquid medium to the dispensing means, to cause the intermittent dispensing of the liquid medium; and
means for draining unsolidified liquid medium from the tank means into the lower reservoir means for reuse.

69. Apparatus as recited in claim 68, which further comprises filter means for removing extraneous solidified material from the liquid medium as it drains from the tank means into the reservoir means.

* * * * *